United States Patent
Lipner

[15] 3,644,128
[45] Feb. 22, 1972

[54] METHOD OF PREPARING COMMINUTED MEAT PRODUCTS

[72] Inventor: Stuart Lipner, P.O. Box 2087, Newark, N.J. 07114

[22] Filed: Dec. 28, 1970

[21] Appl. No.: 102,135

Related U.S. Application Data

[63] Continuation-in-part of Ser. No. 622,422, Mar. 13, 1967, abandoned.

[52] U.S. Cl. ..........................99/108, 99/21, 99/109
[51] Int. Cl. .............................A22c 11/00, A22c 18/00
[58] Field of Search ...............99/21, 108, 109; 260/112; 424/195

[56] References Cited

UNITED STATES PATENTS

| | | | |
|---|---|---|---|
| 2,171,428 | 8/1939 | Griffith et al. | 99/109 |
| 3,073,700 | 1/1963 | Ziegler | 99/21 |
| 3,449,124 | 6/1969 | Lipner | 99/108 |

OTHER PUBLICATIONS

Whistler, " Industrial Gums," 1959, Published by Academic Press, New York, Pages 86, 100.

*Primary Examiner*—Hyman Lord
*Attorney*—Arnold G. Gulko

[57] ABSTRACT

Protein enriched meat food products of improved texture, composition and nutritional value which comprises from about 95.0 to 99.96 percent by weight of product of comminuted meat solids base and from 5.0 to 0.04 percent by weight of product of an edible nontoxic proteinaceous binder composition.

The protein binder of the meat product is water-soluble though it comprises principally spray-dried plasma from the blood of slaughtered livestock. However, this protein binder also includes less than 1 percent and preferably from 0.05 to about 0.01 percent by weight of a unique edible anticoagulant which remains in the plasma to complex the protein binder prior to use. This organic material is known popularly as carrageenan. The process for preparing meat products using the unique binder is also described and claimed.

3 Claims, No Drawings

3,644,128

METHOD OF PREPARING COMMINUTED MEAT PRODUCTS

The present application is a continuation-in-part of my prior application Ser. No. 622,422, filed Mar. 13, 1967, now abandoned.

The present invention relates to an improvement in the processing and manufacture of comminuted meat products.

BACKGROUND OF THE INVENTION

One of the difficulties encountered in the manufacture of comminuted meat products or solid pieces of meat such as sausage is the separation of the fat portion of the mix from the comminuted material during the cooking and processing of the meat product. This free fat may accumulate under the surface of the sausage casing and be harmful to the appearance of the product as well as resulting in uneven texture of the meat.

An attempt at a solution to this problem was reported in an early U.S. Pat. No. 2,171,428, which disclosed a composition for stabilization of sausage emulsions which comprises 87–70 percent skimmed milk solids, 3–10 percent serum albumin of blood, and 10–20 percent of a vegetable gum. The proteinaceous ingredient found here is a serum albumin which is of course an ammonium sulfate precipitated protein fraction pulled out of blood serum, which is that portion of whole blood remaining after coagulation of the fibrinogen protein component. The principal deficiencies of this proposed solution is that the ingredients are relatively costly and the processing requires admixing three separate ingredients to prepare a binder. A further and more critical deficiency in this proposed solution is that at least some quantities of the sodium citrate anticoagulant remain in the albumin component and the entire composition is not completely water-soluble.

Therefore, a need exists in processed meat manufactured for a meat product which includes an edible binder, material which is a one-component material, readily available and accepted as a foodstuff. This binder must also be water-soluble in all proportions and totally nontoxic and edible when admixed into the meat at all proportions. It is precisely this type of meat product and method of making the same which has been discovered by applicant and which comprises the foremost feature of novelty of his invention.

THE INVENTION

The discovery which comprises the subject matter of this invention resides in a new and improved method of manufacture of processed meat products comprising a stabilized emulsion of comminuted meat particles and an edible binder ingredient therefor and the improved meat product produced by that method.

It is an important feature of my invention that I have as the edible binder component of my product a protein composition recovered from meat itself. This particular proteinaceous composition is the subject of a separate application, Ser. No. 620,290, filed Mar. 3, 1967, and now abandoned, since it is novel per se and has uses apart from its use in the processing of meat, although the use in meat as a binder is one of the most important uses of the composition.

When spray dried beef plasma is specifically referred to herein, it identifies the product of Example 1 of said application in which 1 part of a 0.5 percent water solution of sodium carrageenate is added to 9 parts of whole bovine blood and mixed, whereupon the plasma is centrifuged out and spray dried at a drier temperature of 140°–180° F. to provide a pale tan, free-flowing cold water soluble powder with a moisture content of about 2 percent.

The edible binder component is principally spray-dried plasma from the blood of animals such as the cow, sheep, goat and hog, whose meat we daily consume. Prior to this invention, however, the blood plasma from slaughtered livestock was either discarded, defibrinated and added to meat, or else permitted to clot or coagulate, dried and sold as fertilizer.

The principal reason the plasma from whole animal blood was not seriously considered for use as a food binder was that it was not able to be collected as an acceptable food additive material and it was not completely soluble in cold water. Up to the time of my use of carrageenan-type hydrocolloids as anticoagulant stabilizers for animal blood plasma, it was not considered feasible to investigate the use of that plasma as an edible binder for meats because it was known to contain residual amounts of citrates or other known anticoagulants. Once, however, the anticoagulant problem was surmounted quite unexpectedly, the second hurdle to use, i.e., water-solubility, was overcome also by spray-drying the plasma which disclosed for the first time the solubilizing property of the carrageenan anticoagulant.

A very definite advantage of this invention is that by using the aforesaid hydrocolloid carrageenan as the anticoagulant for the plasma protein binder composition, said carrageenan forms soluble complexes with the globulins and fibrinogen, hence enabling the spray-dried animal plasma of the invention to be rendered completely water-soluble in ordinary tap water with little or no agitation. In the manufacture of such meat products as sausage the contents are essentially an emulsion of meat, fat and water and a binder. The water normally added during processing is ice water. If the binder is completely miscible in the cold aqueous emulsion, it can readily be seen how this property will benefit the distribution of the binder completely through the sausage.

In the manufacture of cooked processed meat food products, after the mixture or emulsion is chopped and whipped into a stiff dough, it may be formed, stuffed into casings or other container, and heated for cooking. At this point the plasma protein binder composition coagulates and sets up a gellike matrix to trap the meat solids and fats and prevents leaching out of fats and flavors.

Experiments have definitely shown that a spray-dried beef plasma-carrageenan binder for meat solids is superior to any of the other known binder-type materials, such as cereal flours, dry skim milk powders, soy flours. As will become apparent from the examples set forth hereinbelow, it has been found that very little of the spray-dried beef plasma is necessary in comparison to the other aforesaid binders to achieve the objects of this invention. Furthermore, the spray-dried plasma contributes a natural meat flavor.

Reference is made frequently to the meat emulsions which are formed in accordance with the present invention. The term "meat emulsion" indicates an aqueous emulsion of the various components such as comminuted meat particles, water, fat, spices and seasonings, which are extensively intermingled so as to form a homogeneous emulsion system. The binder material is added for the purpose of improving and maintaining the homogeneity of the said emulsion during and after gelation.

The improved meat emulsion, prepared in accordance with the present invention, is modified to include preferably from 1 to 2 ounces of spray-dried beef plasma per 100 pounds of said meat emulsion, although as little as three-quarters of an ounce is frequently sufficient for effective binding action. When added in the aforesaid amounts, spray-dried beef plasma is the only binding material necessary to accomplish the object of this invention. The spray-dried beef plasma can be incorporated into the meat emulsion in any desired fashion, normally as a powder dispersed in a flavoring agent, or in a spice mixture.

Experiments have also established that the natural binding ability of meat normally used in the preparation of comminuted meat products is due in part to its content of a particular type of salt water soluble protein called "myosin." Investigations have shown that only the salt water soluble proteins, namely, myosin, contribute to the natural binding properties of the meat itself. However, in the normal processing of meat, this binding property is very much reduced due to the necessary cooling and subsequent freezing of the meat prior to using it in comminuted meat products. This loss of the natural binding property of meats can be restored by the use of small amounts of spray-dried beef plasma prepared by the method of my invention.

When the sausage batter is chopped, the myosin protein fortified with the spray-dried beef plasma protein dissolves in the water normally present, and surrounds each fat particle. When the batter is later cooked the heat triggers the gelling action of the spray-dried beef plasma, which coagulates to a gel, similar to a cooked egg, and, in this form locks in, so to speak, the fat particles. In this way, the binding and emulsifying action will bind all fat present, so that there will be not fat separation. The solubility characteristics of the binder moreover enable the user to use much less of spray-dried beef plasma to accomplish complete emulsification and binding.

It should also be noted that the character of the proteins of spray-dried beef plasma is the nearest to the actual meat being used in preparation of comminuted meat products. No other type of binder material can come as close to being meaty in flavor characteristics, as spray-dried beef plasma.

Thus by incorporating in meat from about 0.04 to 5.0 percent by weight thereof of a completely water soluble proteinaceous composition comprising:

a. from about 0.5 to 0.01, e.g., 0.0625, percent by weight of an edible aqueous extract of water-soluble hydrocolloid, such as sulfated polysaccharide, e.g., carrageenan, from reed marine seaweed, e.g., from one the genera, Chondrus, Eucheuma and Gigartina, and b. from 99.5 to 99.99 percent by weight of the dried plasma protein portion of animal blood, a product of improved texture and nutritional value is prepared. The proteinaceous composition may be added as a dry edible binder to a comminuted meat base in the form of a slurry of particulate meat solids prior to heating to form a finished agglomerated particular meat product having the particulate entrapped in a protein gel.

The concept of this invention is illustrated in the examples which follow. A number of equivalents will occur to those skilled in the art after consideration of these illustrations. It is my intention to include these equivalents within my invention.

EXAMPLE 1

The following frankfurter test formula was used for measuring the binding properties of spray-dried beef plasma in comparison to other commercially available materials:

| | |
|---|---|
| Beef flank trimmings (40% lean, 60% fat) | 100 lbs. |
| Ice | 30 lbs. |
| Salt | 2.5 lbs. |
| Prague powder | 6 ozs. |
| Seasonings | 12 ozs. |

The above formula was standard and identically processed with the four test binders used. (per 100 pounds of meat)

Lot No. A - 3.5 lbs. of dry skim milk solids for binder.
Lot No. B - 3 lbs. of a cereal flour for binder.
Lot No. C - 2 lbs. of a soy flour isolate for binder.
Lot No. D - 2 ozs. of spray-dried beef plasma for binder.

All ingredients were compounded in the usual way, stuffed into casings and smoked at 120° to 165° F. for 3 hours. After removal from smokehouse the stuffed casings were immersed in water at 160° F. for 2 minutes, drained, then rerinsed in tap water at about 45° F. After cold storage in a refrigerator, lots were examined for fat separation, particularly fat deposition on the outside of casing where it appeared as light colored spots, or coating. Results are listed below:

| Lot No. | Binder Material Used | Observation |
|---|---|---|
| A | 3.5% Dry skim milk solids | Much fat separation. |
| B | 3% Cereal type flours | Some fat separation, less than No. A. |
| C | 2% Soy flour isolate | Slight fat separation, spotty. |
| D | 2 ounces Spray-dried beef plasma (0.12%) | No fat separation, no spots at all. |

From the foregoing it is clear that by using less than one-tenth the amount of spray-dried beef plasma, i.e., 0.12 percent, no fat separation occurred, even at approximately 60 percent fat used in the formula, as compared to the soy flour isolate, used at least 2 pounds per 100 pounds.

EXAMPLE 2

The following experiment involving a high-fat canned loaf-type product, illustrates the superior binding qualities of spray-dried beef plasma. The following formulas and binders were used:

Pork Luncheon Loaf Experimental Formula

| | LOT No. | | |
|---|---|---|---|
| | 1 | 2 | 3 |
| Pork trim (50%) | 30 lbs. | 30 lbs. | 30 lbs. |
| Lean port trimmings (85%) | 20 | 20 | 20 |
| Pork fat | 21 | 21 | 21 |
| Salt, spices and seasonings | 6 | 6 | 6 |
| Ice | 14 | 14 | 14 |
| Water | 9 | 9 | 9 |
| Binders | | | |
| All meat control | none | | |
| Spray-dried beef plasma | | 2 ozs. | |
| Soy protein isolate | | | 2 lbs. |

Emulsions were prepared in usual manner, placed under vacuum for 15 minutes and stuffed into standard cans. Cans were then subjected to temperatures at 122° C. for about 40 minutes, then taken out, and chilled overnight. The following summarizes the results:

| Lot No. and Type | Liquid Separation (%) | Fat Separation (%) |
|---|---|---|
| 1 - Meat Control | 4% | 2.5% |
| 2 - Spray-dried beef plasma | none | none |
| 3 - Soy flour isolate | 0.75% | 1% |

Color retention in finished product was excellent in all three lots tested.

EXAMPLE 3

Spice mixtures, as shown below, were prepared and used with plasma protein binders in the preparation of standard frankfurter and sausage formulas, and incorporated in the amount of 14 ounces per 100 pounds.

Sausage Spice Mixture

| | |
|---|---|
| Ground White pepper | 4 ounces |
| Rumanian coriander (ground) | 1½ ounces |
| Ground Cardamon | ⅛ ounce |
| Ground yellow mustard seed | ¾ ounce |
| Ground ginger | ⅛ ounce |

Plus
5 ounces of dextrose with:
2.1 g. oleoresin nutmeg
0.7 g. nutmeg oil
0.4 g. pimento leaf oil
2 ozs. spray-dried beef plasma Frankfurter Spice Mixture

| | |
|---|---|
| Ground white pepper | 4 ounces |
| Rumanian coriander (ground) | 1½ ounce |
| Mustard ground | ¾ ounce |
| Ground ginger | ⅛ ounce |

| | |
|---|---|
| Ground cardamon | ⅛ ounce |

Plus
4 ounces of dextrose with:
2.1 g. oleoresin nutmeg
0.7 g. nutmeg oil
0.4 g. pimento leaf oil
2 ozs. spray-dried beef plasma Above spice mixtures with spray-dried beef plasma are blended in with the meat portions of the formula first, followed by the others, the fat portion of formula being last to be blended in. The product in each case showed no fat separation and exhibited an even firm texture.

It is also understood that throughout the text of this invention the amounts of spray-dried beef plasma mentioned are 2 ounces, but under certain circumstances, more or less than aforesaid 2-ounce level may be used.

EXAMPLE 4

100 pounds of pork trimmings, rich in fat, are ground up, and a mixture of 7 ounces soy protein flour and 1 ounce of spray-dried beef plasma are blended in. An additional 100 pounds of the same pork trimmings are ground up, but no binders are added.

A similar third test sample was made up except no binder added. A fourth batch like the first three in all respects except 7 ounces of soy protein flour was substituted as a binder. These were marked as follows;

Lot a - No binder was added to serve as control.
Lot b - Seven ounces of soy protein flour.
Lot c - One ounce of spray dried beef plasma.
Lot d - Seven ounces of soy protein flour plus one ounce of spray dried beef plasma.

Each lot was handled exactly the same way. Patties made from the above lots were grilled and the following observations were made:

Lot a - Meat fell apart and shrunk during grilling.
Lot b - Meat held fairly firm, and very little shrinkage was observed.
Lot c - Meat held very firm and no shrinkage was observed.
Lot d - Meat held very firm and no shrinkage was observed.

From the observations, it is concluded that spray-dried beef plasma can function either by itself or with other type binder materials to accomplish the end results. Lots c and d from above had a larger circumference when grilling was finished, indicating complete fat emulsification and stabilization.

EXAMPLE 5

The following bologna formula was prepared using standard ingredients and the basic costs for the meat proteins noted. Formula was modified slightly so as to include spray-dried beef plasma, with costs also noted, with the following results:

Experimental Bologna Formula (200 lb. Batch)

| | |
|---|---|
| Fresh bull meat | 75 pounds |
| Lean pork trimmings (80%) | 17 pounds |
| Pork fat | 12 pounds |
| Binder flour | 9 pounds |
| Salt, cure, spices, etc. | |

Modified Experimental Bologna Formula (200 lb. Batch)

| | |
|---|---|
| Frozen bull meat | 67 pounds |
| Port trimmings (50%) | 75 pounds |
| Pork fat back | 20 pounds |
| Spray-dried beef plasma | 3¼ ounces |
| Salt, cure, spices, etc. | |

The above modified bologna formula was reduced in cost slightly in excess of 20 percent over the manufacture cost of the formula made up without the addition of spray-dried beef plasma and yet the texture of both products was satisfactory despite the increased fat content.

While the aforegoing examples disclose the invention as applied to the preparation of comminuted meat solids containing products, it should be realized that it will apply with equal value to such meat products as hams, corned beef, roast beef and the like which are prepared to give a one-piece appearance. These meat foods are prepared by separating muscle on the seams, removing part or all of the fat, putting the muscle tissue pieces together so that the product has a clean appearance and the grains of meat are aligned to give better cuttability and binding quality.

Furthermore, where comminuted meats have a formula which includes 40 percent or more lean bullmeat and a controlled fat content of not more than 20 percent it is possible to add as little as 0.001 parts of the hydrocolloid additive such as carrageenan and still obtain a satisfactory product because of the low-fat content and the high level of lean bullmeat. As will be particularly evident from my prior application Ser. No. 620,290, the carrageenan may be employed as such or in salt form.

With regard to the texture of the product, it is a known fact that meat products contained within a casing which have a uniform texture are found to peel well. Therefore, it might be expected that those meat products so prepared to have a uniform texture would have excellent peelability.

The invention is defined in the claims which follow.

I claim:

1. A method of preparing meat food products of improved texture and nutritional value comprising incorporating in a cold aqueous emulsion of comminuted meat solids from 0.04–5 percent by weight of the product of dried animal blood plasma, said plasma including from 0.01 to less than 1 percent by weight of a nontoxic and edible water soluble sulfated polysaccharide hydrocolloid anticoagulant to render said plasma completely soluble in the cold aqueous meat emulsion, said hydrocolloid being an aqueous extract of a marine seaweed selected from the group consisting of those of the genus Chondrus, genus Eucheuma and genus Gigartina, whereby the distribution of the plasma protein in the meat emulsion is enhanced by said anticoagulant, and heating said emulsion containing said plasma to coagulate said plasma to bind the fat component of said meat solids.

2. A method as recited in claim 1 in which said plasma is spray dried and is present in an amount of from 1 to 2 ounces per 100 pounds of said emulsion.

3. A method as recited in claim 1 in which said sulfated polysaccharide is carrageenan and is present in said plasma in an amount of from 0.05 to about 0.01 percent by weight.

* * * * *